(12) United States Patent
Pause

(10) Patent No.: US 6,230,444 B1
(45) Date of Patent: May 15, 2001

(54) BUILDING CONDITIONING TECHNIQUE USING PHASE CHANGE MATERIALS

(75) Inventor: Barbara Pause, Longmont, CO (US)

(73) Assignee: Outlast Technologies, Inc., Boulder, CO (US)

(*) Notice: Subject to any disclaimer, the term of this patent is extended or adjusted under 35 U.S.C. 154(b) by 0 days.

(21) Appl. No.: 09/297,755

(22) Filed: May 5, 1999

Related U.S. Application Data

(60) Provisional application No. 60/041,379, filed on Mar. 26, 1997.

(51) Int. Cl.[7] .................................................. E04H 9/00
(52) U.S. Cl. .............................. 52/1; 52/173.1; 165/48.1
(58) Field of Search ........................ 52/1, 169.11, 173.1, 52/173.3, 309.1, 309.4; 165/104.13, 104.14, 104.21, 10, 49, 48.1, 47

(56) References Cited

U.S. PATENT DOCUMENTS

| | | |
|---|---|---|
| 4,178,727 | * 12/1979 | Prusinski et al. . |
| 4,259,401 | * 3/1981 | Chahroudi et al. . |
| 4,498,459 | * 2/1985 | Korin et al. . |
| 4,587,279 | * 5/1986 | Salyer et al. . |
| 4,747,240 | * 5/1988 | Voisinet et al. . |
| 4,908,166 | * 3/1990 | Salyer . |
| 5,532,039 | * 7/1996 | Payne et al. . |

\* cited by examiner

*Primary Examiner*—Blair M. Johnson
(74) *Attorney, Agent, or Firm*—Holland & Hart LLP

(57) ABSTRACT

The technique of the present invention for minimizing the floor-to-ceiling temperature gradient of a room containing a ceiling, a floor, walls and at least one door and one window, includes the utilization of a phase change material adjacent the ceiling surface and a phase change material adjacent the floor surface. In order to effectively minimize the floor-to-ceiling temperature gradient of the room, first and second phase change materials may be either the same or different, or may be blends of phase change materials. Most preferably, the melting temperature of the first phase change material adjacent the ceiling is greater than the crystallization temperature of the second phase change material adjacent the floor. Preferably, the melting temperature of the first phase change material is 25° C. plus or minus 1° C. and the crystallization temperature of the second phase change material is 22° C. plus or minus 1° C.

26 Claims, 3 Drawing Sheets

BUILDING CONDITIONING TECHNIQUE USING PHASE CHANGE MATERIALS

RELATED APPLICATIONS AND TECHNOLOGY

The present application claims priority from U.S. Provisional Patent Application Ser. No. 60/041,379 entitled BUILDING CONDITIONING TECHNIQUE USING PHASE CHANGE MATERIALS, filed Mar. 26, 1997, which is incorporated in its entirety herein by reference. The present application also relates to the technology disclosed in U.S. Pat. No. 5,532,039 for THERMAL BARRIERS FOR BUILDINGS, APPLIANCES AND TEXTILES, which is assigned to the assignee of the present application and is also incorporated in its entirety herein by reference.

FIELD OF THE INVENTION

The present invention relates to building materials having enhanced thermal properties. More particularly, the present invention relates to construction techniques utilizing materials containing phase change materials.

BACKGROUND OF THE INVENTION

It is generally known that a comfortable room climate in residential and industrial buildings is attained when (i) the average room temperature is constant over time; and (ii) the temperature distribution in the room is constant, i.e., there are no drafts. The comfort sensation is especially dependent upon the temperature gradient between floor and ceiling. The greater the temperature gradient between floor and ceiling, the less comfortable the room feels. In winter, for example, a temperature gradient in a room of 5° C. or more may exist. Such a floor-to-ceiling temperature gradient leads to a cold sensation in an occupant's lower body and a warm sensation in the occupant's upper body and head, resulting in a generally uncomfortable feeling.

To achieve a comfortable room, it is important to reduce the floor-to-ceiling temperature gradient to about 3° C., or less. Studies have shown that when a floor-to-ceiling temperature gradient is greater than 3° C., the comfort range of the room (i.e., the room temperature range which is perceived as comfortable to the occupants) is lower than with a lower floor-to-ceiling temperature gradient. When occupants perceive a room as comfortable, it has been shown that they will voluntarily lower the thermostat setting of the room, thereby maintaining the room at a lower average temperature with a commensurate decrease in energy consumption and costs.

The temperature gradient in a room is normally established as a result of warmer air in the room having a lower density than colder air in the room. The lower density warmer air migrates to and remain at the top of the room. This leaves the coldest air at the bottom of the room, and establishes a gradient of air temperatures between the warmer air near the ceiling and the colder air at the floor. Conventional techniques usually involve the heating of air near the floor, using, for example, baseboard hot water or hot air radiators located on or adjacent the intersection of floor and walls. Newer techniques such as in-floor heating ducts or wires also heat the colder air at the floor. However, such conventional techniques typically neglect the effect an excessively high ceiling temperature has on a room's floor-to-ceiling temperature gradient.

Of course ceiling fans are sometimes installed in homes and public buildings in an attempt to redistribute the warmer air near the ceiling. However the drafts created by ceiling fans can make the room feel colder and less comfortable to the room's occupants.

Some industrial plants have installed cooling systems in the ceiling area of manufacturing facilities where excessive heat is generated during manufacturing or processing. Such cooling systems typically remove heat generated in manufacturing or production processes so that manufacturing or production processes do not have to be intermittently shut down to allow the room to cool.

Phase change materials such as salt hydrates, metals, alloys, poly-alcohols, eutectics and paraffins have been proposed as materials useful for controlling temperature changes. Generally speaking, phase change materials possess an ability to change their physical state (e.g., from a solid to a liquid and vice-versa) in a given temperature range when either absorbing or emitting heat. During a period of rising temperature, heat is absorbed by phase change materials until the melt temperature is reached. During a period of decreasing temperature, heat stored in a liquid phase change material is released when the solidification temperature of the phase change material is reached.

There are significant differences between the latent heat of absorption during the phase change temperature range and the sensible heat absorption which occurs outside the phase change range. For example, water, a common phase change material, releases a latent heat of approximately 335 kilojoules per kilogram (kJ/kg) when it freezes and becomes ice. Conversely, when ice melts, it absorbs heat at a rate of approximately 335 kJ/kg. When water or ice is not at a phase change temperature, its sensible heat absorption or emission is 4kJ/kg. It can be seen that the latent heat absorption during a phase change is nearly 100 times higher than the sensible heat absorption outside a phase change temperature.

Another quality of phase change chemistry is that the temperature of the phase change material during latent heat absorption remains constant. In contrast, the temperature of a material during sensible heat variations changes. Thus, when sensible heat is absorbed by a phase change material, the temperature of the phase change material rises. When sensible heat is emitted by a phase change material, the temperature of the phase change material falls.

Phase change materials have been suggested for use in building construction. For example, U.S. Pat. Nos. 4,587,279 and 4,617,332 teach the direct addition of phase change materials into the wet mix stage of concrete. However, this technique can reduce the compressive and other strength properties of the resulting concrete.

Phase change materials such as glass containers, have been used in interior and exterior walls. Because, however, convective heat flow in a room typically travels up the wall surface (i.e., parallel to the wall), and does not directly strike the wall surface, the phase change material in the walls is not significantly engaged. In addition, phase change containment structures designed for walls have not been widely adapted to other surfaces due to the different mechanical requirements of walls as compared to floors and ceilings.

SUMMARY OF THE INVENTION

The technique of the present invention for minimizing the floor-to-ceiling temperature gradient of a room containing a ceiling, a floor, walls, at least one door and at least one window, includes the utilization of a first phase change material adjacent the ceiling surface and a second phase change material adjacent the floor surface. In order to effectively minimize the floor-to-ceiling temperature gradient of the room, the first and second phase change materials may be either different or the same, with the melting temperature of the first phase change material adjacent the ceiling higher than the crystallization temperature of the second phase change material adjacent the floor. In one embodiment of the technique of the present invention, a principal portion of the first phase change material positioned adjacent the ceiling surface is heptadecane, and a principal portion of the phase change material adjacent the floor surface is octadecane. In a preferred embodiment of the technique of the present invention, the melting temperature of the first phase change material is 25° C. plus or minus 1° C. and the crystallization temperature of the second phase change material is 22° C. plus or minus 1° C.

DETAILED DESCRIPTION

Figure 1:
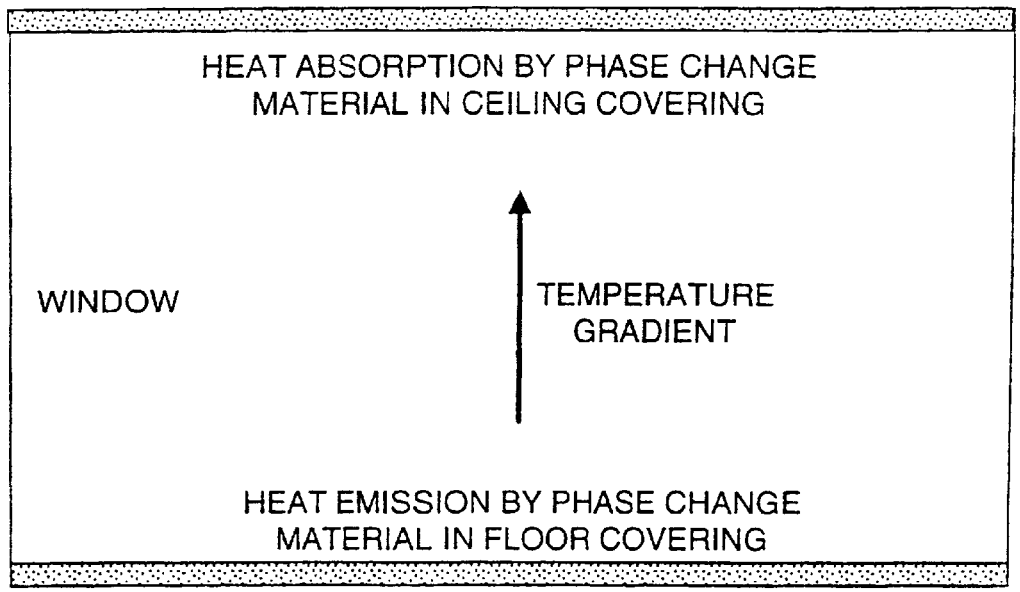
FIG. 1 is a schematic of a vertical section of a room in which the floor/ceiling temperature gradient of the room is minimized and the comfort range lowered by incorporating the building construction technique of the present invention.

Applicant has discovered that incorporation of temperature stabilizing phase change materials in both the ceiling material and the floor covering can minimize the temperature gradient typically present in rooms from floor-to-ceiling, and also further minimize convection of air and formation of drafts in rooms. The temperature gradient, convection of air and formation of drafts are minimized by the phase change materials in the ceiling absorbing heat prior to melting, thereby effectively delaying an increase in room temperature near the ceiling above the melting point, and the phase change materials in the floor materials effectively delay the cooling of floor materials below the freezing temperatures of phase change material.

The preferred temperature gradient thereby established from floor-to-ceiling is 3° C. or less, most preferably less than 3° C. In an interior room, the phase change materials are preferably encapsulated and present in a thickness of from 3 to 10 mm in the ceiling and also in the floor material. It is most preferable when employing the present invention in an interior room, that is, a room without windows or with minimal window exposure to the outside, that phase change materials be incorporated only into the ceiling and floor of the interior room.

Most preferably, the phase change materials are incorporated in a panel system in which the phase change materials are restricted within flexible containment envelopes, which, in turn, are overlaid with lattice. Metal lattice are preferred, with aluminum and aluminum alloys the preferred lattice material. The lattice defines a plurality of side-by-side spaced apart holes which can accommodate expected expansion of the phase change material within the containment envelopes. The containment envelopes are preferably 10 mm thick. The width of the cells defined by adjacent lattices is preferably approximately 12–14 mm. The cover is a rigid member which, when used for flooring applications, provides mechanical support for the people and the furnishings in the room. The cover can also serve as a fire retardant to prevent fire from spreading to the panels.

In alternative embodiments of flooring materials of the present invention, phase change materials may be incorporated into carpet backing, foam or other liners upon which a carpet in installed, or even in carpet fibers. In alternative embodiments of ceiling materials of the present invention, the phase change materials may be incorporated into ceiling tiles. Details of these embodiments are further discussed below.

To test the effectiveness of the present invention, a test protocol was developed utilizing two 2'×2'×2' boxes fabricated using acrylic panels. The ⅛" acrylic panels of the first "control" box were empty. The acrylic panels employed in the second box totaled the same thickness but were filled with phase change material.

The heat source for each of the control and PCM boxes was a 100 watt light bulb suspended centrally in each box. The light bulbs were controlled by separate thermostats placed in each box. Because the thermostats could not be precisely set at specific temperatures, the "on/off" temperatures may have varied slightly.

Probes were affixed in each box, with one taped probe facing the floor and one taped probe facing ceiling surface. An additional probe was mounted to the center of one of the vertical walls of the PCM box. All probes and thermostats were shielded from direct heat radiation.

To conduct the tests, the control and PCM boxes were placed in a climate control room having an ambient temperature of from 56.5° F. to 59.0° F. The boxes were sealed to eliminate air flow. Each box was wrapped with two layers of air bubblepack insulation having an R value of 5.6 per layer. Each test was run for a minimum of six hours. Data from a continuous two hour period which represented the most consistent data was selected as representative. Test results are summarized in Table 1.

TABLE 1

|  | CONTROL | | PCM FLOOR & CEILING | | PCM FLOOR ONLY | | PCM CEILING ONLY | |
| --- | --- | --- | --- | --- | --- | --- | --- | --- |
|  | range | Δ | range | Δ | range | Δ | range | Δ |
| FLOOR | 67.1–69.4 | 2.3 | 69.0–71.0 | 2.0 | 69.7–71.0 | 1.3 | 67.2–68.3 | 1.1 |
| CEILING | 70.3–73.7 | 3.4 | 71.0–72.9 | 1.9 | 70.3–72.8 | 2.5 | 69.0–71.0 | 2.0 |
| WALL | — | — | 69.0–71.0 | 2.0 | 68.7–71.0 | 2.3 | 68.4–70.4 | 2.0 |
| FLOOR-CEILING RANGE | 67.7–73.7 | 6.0 | 69.0–72.9 | 3.1 | 69.7–72.8 | 3.1 | 67.2–71.0 | 3.8 |
| CYCLES PER HR |  | 4 |  | 2.5 |  | 3.0 |  | 3.0 |

To reduce the floor-to-ceiling temperature gradient, it is now recognized that the preferred arrangement of temperature stabilizing phase change materials are vertical to the temperature gradient. At a minimum, the ceiling temperature differential should be minimized. Most preferably, the ceiling and floor temperature differentials should be minimized. A preferred thermoregulating effect is achieved when temperature stabilizing phase change materials would be on the surface of the floor and the ceiling of the room. Preferably the complete surfaces of the floor and the ceiling are covered with the temperature stabilizing phase change materials in certain quantities. If only parts of the floor and ceiling are covered with the temperature stabilizing phase change material, the phase change material quantity has to be enhanced to obtain the same thermoregulating effect which is received under a complete covering.

It is noted that a reduction in the temperature gradient is also obtained if only the floor or the ceiling is covered with temperature stabilizing phase change material. That means that an arrangement of temperature stabilizing phase change material only in a floor covering or only in a ceiling covering is also appropriate. The arrangement of the preferred arrangement of the temperature stabilizing Phase Change Material is shown in FIG. 1.

The minimum temperature at the floor should be 19° C. and the maximum temperature at the floor should be 25° C., with a preferred temperature of 22° C. Assuming the preferred floor temperature of 22° C. and a preferred temperature gradient of not more than 3° C., the appropriate ceiling temperature should be 25° C. Preferably one or two phase change materials should be selected in which their phase changes takes place in a temperature range between 21° C. and 26° C. Most preferably, the phase change material in the floor should be selected to release heat if the floor temperature drops under 22° C., and thus, its crystallization point should be about 22° C. The phase change material selected to absorb surplus heat on the top of the room has a preferred melting point or temperature of about 25° C. It will be understood by those skilled in the art to which the present invention pertains, that temperatures given here are not exact temperatures, but rather approximate temperatures. Especially in the case of phase change material mixtures, the melting and crystallization points or temperatures are likely to cover a range, rather than a single degree.

Phase change materials having phase changes in the preferred temperature ranges of the present invention include linear crystalline alkyl hydrocarbons (paraffins) listed in Table 2, and mixtures thereof.

TABLE 2

| PHASE CHANGE MATERIAL | Melting Point ° C. | Crystallization Point ° C. | Latent Heat of Absorption J/g | Latent Heat of Emission J/g |
| --- | --- | --- | --- | --- |
| Hexadecane | 21.1 | 12.2 | 235.2 | 236.6 |
| Heptadecane | 25.0 | 16.5 | 176.4 | 182.6 |
| Octadecane | 31.2 | 22.0 | 244.8 | 246.4 |
| Nonadecane | 34.4 | 26.4 | 177.6 | 182.6 |

In view of the temperature requirements discussed above, octadecane is a preferred phase change material for incorporation in or on a floor (these positions collectively referenced to herein as "adjacent" the floor or floor surface), due to octadecane's crystallization point of 22.0° C. Heptadecane, with 250° C. melting point, is a preferred phase change material for incorporation in or on a ceiling surface.

Figure 2:
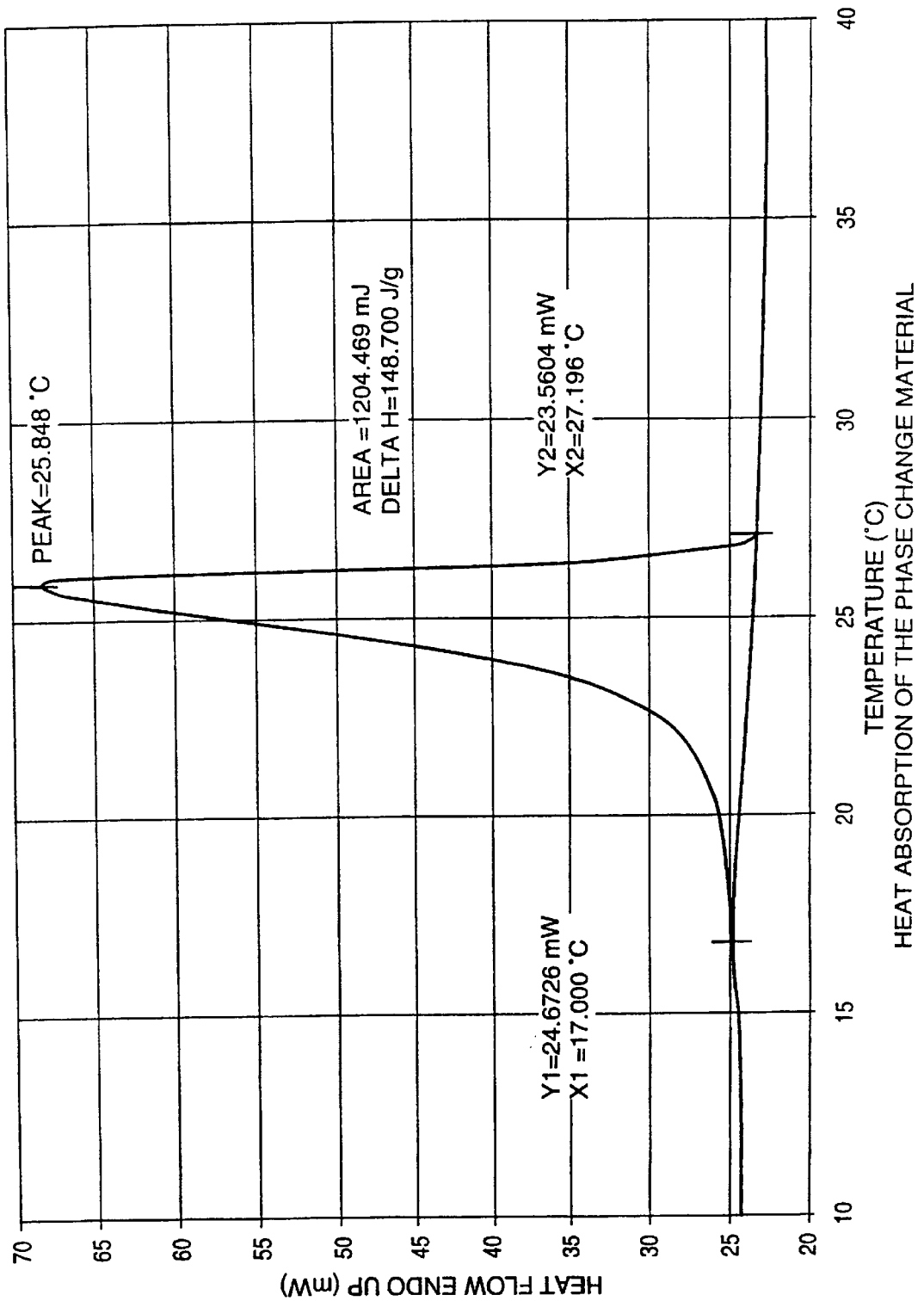
FIG. 2 is a differential scanning calorimetry heat absorption diagram for a phase change material blend useful in the building construction technique of the present invention.
Figure 3:
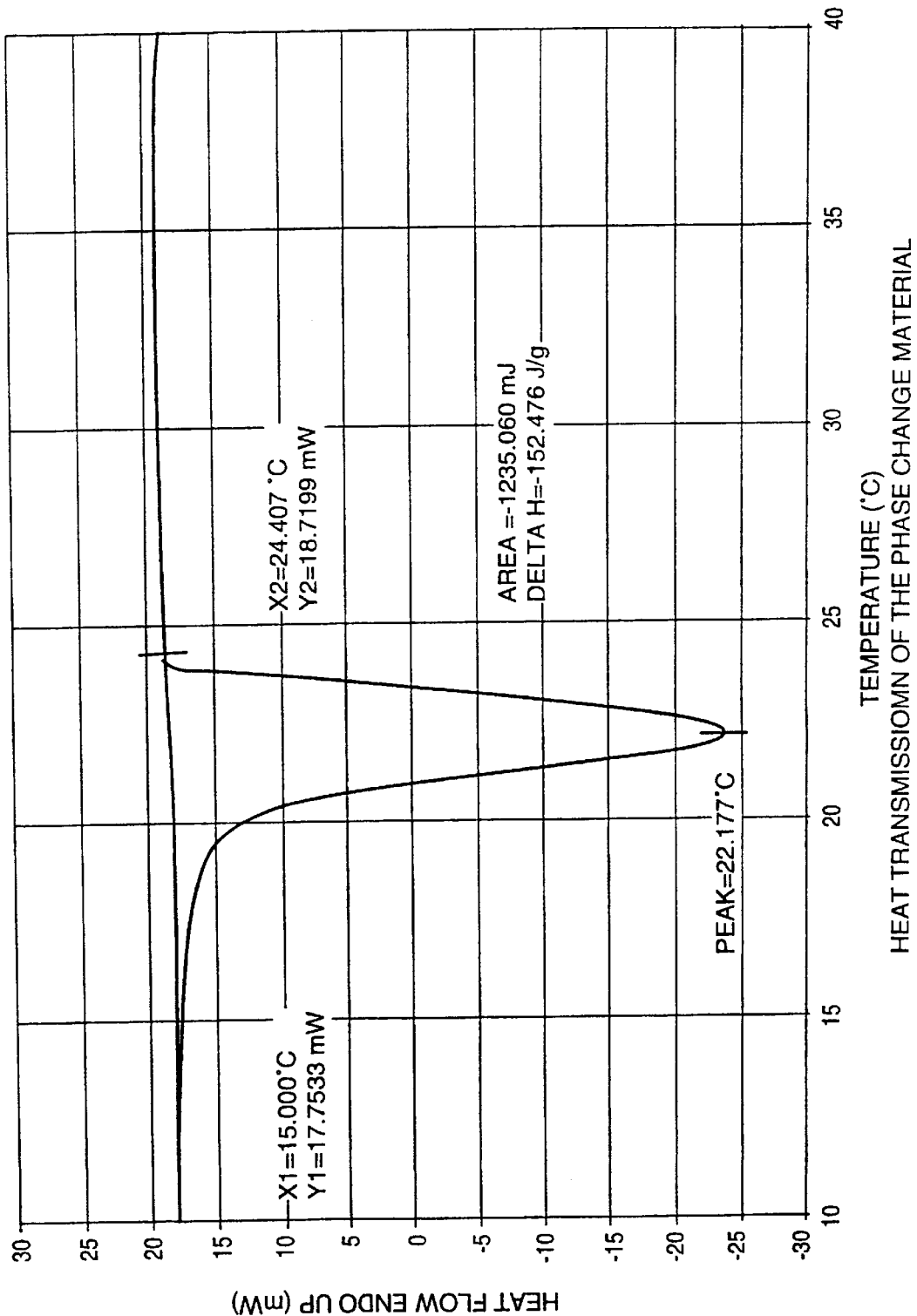
FIG. 3 is a differential scanning calorimetry heat emission diagram for a phase change material blend different than that illustrated in FIG. 2, but also useful in the building construction technique of the present invention.

A blend of the four phase change materials listed in Table 2 is suitable for both floor and ceiling placement. FIGS. 2 and 3 illustrate differential scanning calorimetry diagrams showing both heat absorption and emission of such a blend. This blend possesses a melting point of about 25° C. and a crystallization point of about 22° C. Its latent heat capacity is about 150 J/g.

The four phase change materials listed in Table 2 are nontoxic, noncorrosive, nonhydroscopic, stable to thermocycling and show no supercooling effect. These properties makes them especially suitable for building applications. Problems associated with low resistance to ignition can be overcome by adding fire retardants such as halogenated hydrocarbons (chlorinated, brominated or fluorinated hydrocarbons). The flame retardant should be preferably incorporated into the phase change material in a quantity of approximately 10% of the total weight to provide a self-extinguished effect. It has been determined that the incorporation of flame retardant additives do not cause a change in the melting and crystallization temperatures.

Other phase change materials such as polyethylene glycol, mixtures of different acids or salt hydrates seems also to be appropriate for an application in this building conditioning technique because of the temperature range where their phase change takes place and their latent heat capacity.

The application of the suggested phase change material where the latent heat absorption/emission during solid-liquid transitions is used to establish a thermoregulating effect makes its enclosure in containment structures necessary. Such containment structures are either microcapsules with diameters between 1 and 10 microns, or special constructed container systems.

Microencapsulated phase change material can, for example, be applied to the ceiling tiles in form of a coating. The thickness of this coating layer should be approximately 3 mm. A coated phase change material layer of 3 mm thickness causes a weight increase of the ceiling tile of 1 m$^2$ by about 2 kg.

For a floor application the microencapsulated phase Change material can be filled into the air spaces of a three-dimensional lattice-like fabric or a foam material by a soaking process. The thickness of the three-dimensional fabric or the foam should be approximately 5 mm to include enough phase change material. The three-dimensional lattice fabric or the foam can then be either laminated to the back side of the carpet or can be used to create separate floor tiles. The floor tiles should have a fabric coverage on both sides to avoid a loss or damage of microencapsulated phase change material during the use. Another possibility for a floor application is to make the carpet from Acrylic fibers with incorporated microencapsulated phase change material or to coat the back side of the carpet with microencapsulated phase change material.

These applications are suitable to reduce the temperature gradient in small interior rooms especially of residential buildings. In larger rooms a higher quantity of temperature stabilizing phase change material may be necessary to get desired effects.

Figure 4:
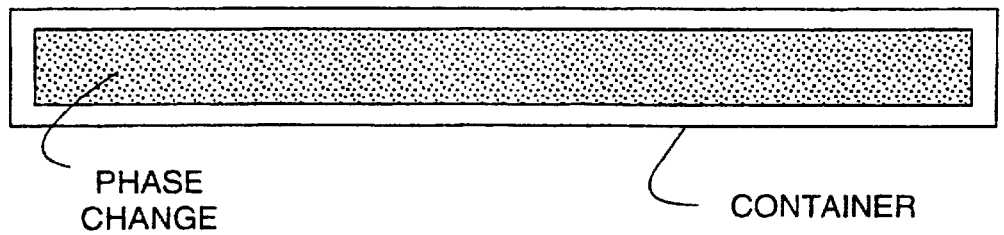
FIG. 4 is a plan view of a ceiling tile containing phase change material useful in the building construction technique of the present invention.
Figure 5:
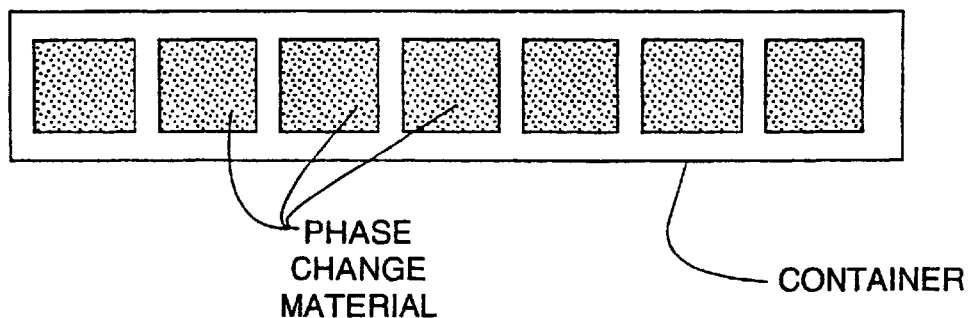
FIG. 5 is a plan view of a floor tile containing phase change material useful in the building construction technique of the present invention.

For this purpose container-like ceiling tiles should be used which include a larger quantity of temperature stabilizing phase change material. This container should be directly attached to the ceiling. The phase change material layer in the liquid stage should be about 10 mm thick. Such a container with a size of 0.5 m by 1 m would include a phase change material quantity of approximately 3.5 kg. The container bottom should be made of a material with a high thermal conductivity and a smooth surface to ensure a good heat transfer to the phase change layer so that the phase change material can properly absorb the surplus heat. A plan view of such a tile is shown in FIG. 4.

Otherwise, to enhance the quantity of the temperature stabilizing phase change material in the floor, container-like structures should be used which are located between the insulation layer and composition flooring, with a thickness of the composition flooring not exceeding 20 mm. A honeycomb-like structure is preferably used to contain the phase change material. The cells should have a size of approximately 10 mm×10 mm×10 mm.

Because phase change materials react on any temperature change in the environment by absorbing or emitting heat, overnight temperature changes can be used to recharge phase change materials. A floor application of a phase change material can also be beneficially employed in combination with a floor heating system. Peak energy demands over the daytime can then be shifted to off peak hours overnight by using the floor heating overnight to recharge the phase change material. The stored latent heat inside the phase change material can then be used to fulfill the heating requirements over the day. This technique should substantially reduce utility costs.

In buildings where large amounts of heat are generated over the day, for instance by machinery, equipment or solar radiant incidence from outside, it would be appropriate to use ceiling tiles containing phase change material in combination with a cooling system. The cooling system can be used to take out the heat absorbed by the phase change material to get it recharged. This can also be done in off peak hours overnight so that also in this case the energy demand for cooling purposes can be shifted to off peak hours which also leads to a substantial utility cost reduction.

Furthermore, using an air conditioning system in a building, the operation time and therefore the heating and cooling requirements can be substantially reduced. Estimations based on experimental data have shown that by covering floor and ceiling of a room (30m$^2$) with a phase change layer of about 3 mm, which includes a phase change material quantity of about 70 kg, the use of the air conditioning system could be reduced by about 40% which is another important benefit of the thermoregulating effect created by the phase change material.

Presently preferred embodiments of the present invention and many of its improvements have been described with a degree of particularity. It should be understood that this description has been made by way of preferred examples, and that the invention is defined by the scope of the following claims.

What is claimed is:

1. A method of minimizing a floor-to-ceiling temperature gradient of a room containing at least a ceiling surface, a floor surface, and walls, comprising:
    incorporating a first phase change material adjacent the ceiling surface, said first phase change material having a melting temperature; and
    incorporating a second phase change material adjacent the floor surface, said second phase change material having a crystallization temperature:
        wherein said melting temperature of said first phase change material is greater than said crystallization temperature of said second phase change material.

2. The method of minimizing a floor-to-ceiling temperature gradient of a room according to claim 1, wherein said melting temperature of said first phase change material is 25° C. plus or minus 1° C. and said crystallization temperature of said second phase change material is 22° C. plus or minus 1° C.

3. The method of minimizing a floor-to-ceiling temperature gradient of a room according to claim 2, wherein the walls are free of phase change materials.

4. The method of minimizing a floor-to-ceiling temperature gradient of a room according to claim 1, wherein the walls are free of phase change materials.

5. The method of minimizing a floor-to-ceiling temperature gradient of a room according to claim 1, wherein the step of incorporating a first phase change material further comprises the step of:
    installing ceiling tiles containing said first phase change material on the ceiling surface.

6. The method of minimizing a floor-to-ceiling temperature gradient of a room according to claim 1, wherein the step of incorporating a first phase change material further comprises the step of:
    applying a coating containing said first phase change material to the ceiling surface.

7. The method of minimizing a floor-to-ceiling temperature gradient of a room according to claim 2, wherein the step of incorporating a first phase change material further comprises the step of:
    installing ceiling tiles containing said first phase change material on the ceiling surface.

8. The method of minimizing a floor-to-ceiling temperature gradient of a room according to claim 2, wherein the step of incorporating a first phase change material further comprises the step of:
    applying a coating containing said first phase change material to the ceiling surface.

9. The method of minimizing a floor-to-ceiling temperature gradient of a room according to claim 1, wherein the step of incorporating a second phase change material further comprises the step of:
    installing floor tiles containing said second phase change material on the floor surface.

10. The method of minimizing a floor-to-ceiling temperature gradient of a room according to claim 1, wherein the step of incorporating a second phase change material further comprises the step of:
    laying a carpet containing said second phase change material on the floor surface.

11. The method of minimizing a floor-to-ceiling temperature gradient of a room according to claim 2, wherein the step of incorporating a second phase change material further comprises the step of:
    installing floor tiles containing said second phase change material on the floor surface.

12. The method of minimizing a floor-to-ceiling temperature gradient of a room according to claim 2, wherein the step of incorporating a second phase change material further comprises the step of:
    laying a carpet containing said second phase change material on the floor surface.

13. A building room containing at least a ceiling surface, a floor surface, and walls, further comprising:
    a first phase change material having a melting temperature and fixedly positioned adjacent the surface of the ceiling; and
    a second phase change material having a crystallization temperature and fixedly positioned adjacent the floor surface;
        wherein said melting temperature of said first phase change material is higher than said crystallization temperature of said second phase change material, with said first and second phase change materials adapted to minimize a floor-to-ceiling temperature gradient established in the room.

14. The building room according to claim 13, wherein said melting temperature of said first phase change material is 25° C. plus or minus 1° C. and said crystallization temperature of said second phase change material is 22° C. plus or minus 1° C.

15. The building room according to claim 13, wherein the walls are free of all phase change material.

16. The building room according to claim 14, wherein the walls are free of all phase change material.

17. The building room according to claim 13, further comprising:
ceiling tiles containing said first phase change material positioned adjacent the ceiling surface.

18. The building room according to claim 14, further comprising:
ceiling tiles containing said first phase change material positioned adjacent the ceiling surface; and
floor tiles containing said second phase change material adjacent the floor surface positioned adjacent the floor surface.

19. The building room according to claim 13, further comprising:
floor tiles containing said second phase change material positioned adjacent the floor surface.

20. The building room according to claim 14, further comprising:
a carpet containing said second phase change material positioned adjacent the floor surface.

21. A method of minimizing a floor-to-ceiling temperature gradient of a room in accordance with claim 1, wherein a principle portion of the first phase change material is heptaecane, and a principle portion of the second phase change material is octadecane.

22. The building room according to claim 13, wherein a principle portion of the first phase change material is heptaecane, and a principle portion of the second phase change material is octadecane.

23. A method of minimizing a floor-to-ceiling temperature gradient of a room in accordance with claim 1 including the step of:
incorporation a flame retardant into at least one of the first and second phase change materials.

24. A method of minimizing a floor-to-ceiling temperature gradient of a room in accordance with claim 23 wherein the flame retardant comprises approximately 10 percent of the total weight of the fire retardant and the at least one of the first and second phase change materials.

25. The building room according to claim 13 including a flame retardant incorporated into at least one of the first and second phase change materials.

26. The building room according to claim 25 wherein the flame retardant comprises approximately 10 percent of the total weight of the fire retardant and the at least one of the first and second phase change materials.

* * * * *